United States Patent
Reynafarje Reyna

(10) Patent No.: US 10,869,744 B2
(45) Date of Patent: Dec. 22, 2020

(54) DENTAL DESIGN FOR THE EXTRAPOLATION OF SOFT TISSUE DIMENSIONS

(71) Applicant: Julio Cesar Reynafarje Reyna, Lima (PE)

(72) Inventor: Julio Cesar Reynafarje Reyna, Lima (PE)

(*) Notice: Subject to any disclaimer, the term of this patent is extended or adjusted under 35 U.S.C. 154(b) by 0 days.

(21) Appl. No.: 15/504,091

(22) PCT Filed: Aug. 15, 2016

(86) PCT No.: PCT/PE2016/000013
§ 371 (c)(1),
(2) Date: Feb. 15, 2017

(87) PCT Pub. No.: WO2018/034576
PCT Pub. Date: Feb. 22, 2018

(65) Prior Publication Data
US 2019/0167403 A1   Jun. 6, 2019

(51) Int. Cl.
*A61C 19/05* (2006.01)
*A61C 19/04* (2006.01)
*A61C 19/055* (2006.01)

(52) U.S. Cl.
CPC ............ *A61C 19/05* (2013.01); *A61C 19/04* (2013.01); *A61C 19/055* (2013.01)

(58) Field of Classification Search
CPC ..... A61C 19/04; A61C 19/045; A61C 19/055; A61C 13/1016; A61B 5/107; A61B 5/4552
See application file for complete search history.

(56) References Cited

U.S. PATENT DOCUMENTS

| | | | | |
|---|---|---|---|---|
| 1,323,697 A | * | 12/1919 | King | A61C 19/04 33/513 |
| 1,505,792 A | * | 8/1924 | Ludlum | A61C 19/04 2/11 |
| 2,326,030 A | * | 8/1943 | Hearn | A61B 3/111 33/200 |
| 3,024,534 A | * | 3/1962 | Wilkinson | A61C 19/05 433/73 |

(Continued)

FOREIGN PATENT DOCUMENTS

FR    2609388 A1  *  7/1988  ............. A61C 19/04

OTHER PUBLICATIONS

"Definition of Rule", 2019, Merriam-Webster, https://www.merriam-webster.com/dictionary/rule p. 2 (Year: 2019).*

(Continued)

*Primary Examiner* — Jacqueline T Johanas
*Assistant Examiner* — Shannel N Wright
(74) *Attorney, Agent, or Firm* — Husch Blackwell LLP

(57) ABSTRACT

The invention relates to a device useful for taking dimensions of the stomatognathic system, in particular the soft tissues which circumscribe the masticatory system, in particular the anterior part of the face in relation to the denture. This device has graduated parts that allow taking precise measurements and can be transferred or projected to an articulator, which is used in rehabilitation processes and restorative dentistry.

5 Claims, 2 Drawing Sheets

(56) References Cited

U.S. PATENT DOCUMENTS

| | | | | |
|---|---|---|---|---|
| 4,642,050 | A | * | 2/1987 | Heinix .................. A61C 11/001 433/56 |
| 2006/0160044 | A1 | * | 7/2006 | Olivier ................... A61C 19/04 433/73 |
| 2006/0188839 | A1 | * | 8/2006 | Adams ................... A61C 19/04 433/68 |
| 2008/0187882 | A1 | * | 8/2008 | Margossian ......... A61C 19/045 433/68 |
| 2010/0191510 | A1 | * | 7/2010 | Kopelman ........... A61C 9/0066 703/1 |
| 2016/0030144 | A1 | * | 2/2016 | Hansen ................ A61C 19/045 433/37 |

OTHER PUBLICATIONS

Translation for Foreign patent FR26009388, Jan. 12, 1987 (Year: 2019).*

* cited by examiner

DENTAL DESIGN FOR THE EXTRAPOLATION OF SOFT TISSUE DIMENSIONS

TECHNICAL FIELD

This invention is in the technical field of dental design device, which is associated with the articulators and is used to extrapolate or transfer the lines corresponding to the soft tissues of the face to the upper and anterior dental sector in a rehabilitation dental treatment (dentures, etc.).

OBJECT OF THE INVENTION

The object of the invention is to achieve a greater precision in the dimensioning that is made of the soft tissues of the patient's face, to take them as more accurate reference in the elaboration of a treatment of dental rehabilitation.

BACKGROUND OF THE INVENTION

The Fox plane was the first instrument used in the alignment of the teeth and the bilateral pupillary line, for which a baseline was used, depending on the vision of the operator, which was very subjective and therefore inaccurate. This instrument has been widely used and even modified by adding perpendicular rules that allow the vertical inclination of the plane to be observed (a technique used at the Las Vegas Institute of Advanced Dental Studies in the USA). Kois instrument also helps with this kind of planning.

Recently, another device has been developed, that allows a more reliable projection of the interpupillary line over the oral area, which is used to identify major aesthetic errors, and then develop a therapeutic program that leads to a dento-gingival solution that looks natural and harmonious (horizontal aesthetic reference line); considering that the prosthetic restoration of the teeth of the anterior maxilla represents an aesthetic challenge, for this, the esthetic diagnosis is based on the position of the patient's teeth in relation to the gingiva, lips and face. In addition, said device allows representing all the reference lines in the laboratory, with which there is a substantial reduction of errors in the dental program.

PROBLEM TO BE SOLVED (INVENTION)

In procedures of oral rehabilitation and restorative dentistry, procedures are followed, at the end of which the aesthetic result can be compared and verified with respect to the masticatory function. In this sense, for a better result it is necessary to obtain an adequate dimensioning of the soft tissues that are circumscribed to the anterior dental structure and to transfer those dimensions with the highest possible precision from the patient to the dental laboratory and vice versa.

The device described here allows to accurately translating measures and corrections that were subjective, and even before the creation of this device, were taken subjectively; this allows a more standardized work to project these dimensions in the planning waxing process.

This device allows a harmony between the bilateral pupillary reference line, the midline and the interalar space. The device has a leveling plane of the aesthetic occlusal plane, which allows measuring the inclination of the plane and this data is used by the dental technician in the laboratory for the respective corrections at the time of making the projections to the waxup.

ADVANTAGES OF THE INVENTION

The device described here allows taking dimensions to reestablish the ideal occlusal plane for aesthetic rehabilitation, with the highest possible precision and with respect to the bipupillary line; dimensions that can be easily transferred with this device to the articulator. In this way, the dental technician works in the laboratory with much more reliable, precise and reproducible dimensions; therefore, the final result of the process is esthetically and functionally more consistent with the patient's facial structures, eliminating any dose of subjectivity of the operator in the taking of the dimensions.

DETAILED DESCRIPTION OF THE INVENTION

The invention relates to an device, which consists of several parts, associated or articulated and which is constituted as an instrument or device for taking measurements of the patient's face and recording inclinations of imaginary planes used in dental practice; in particular, these dimensions are necessary in the dental laboratory for the processes of aesthetic treatment and oral rehabilitation.

The device consists of the following parts:

A support to the patient's face, which can be the frame of optical glasses, in whose bow that is fastened to the upper part of the nose near the front of the face, is fused a plate as two centimeters with a hole for a securing screw. This support will allows the assembly of the other parts of the device to register the dimensions that are required, consequently, it must be composed of a material and structure necessary that provides firmness and at the same time fastening to the person face and craniofacial skeleton for the manipulation of the other elements of the device; this is the only function that this support performs; however, the support may have another shape, provided that it conforms to the measurement conditions, which will be explained below.

A second part of the device, which has the form of a window, which will be called a bipupillary alignment rule; the base of the window is formed by an upper horizontal section, for example as a ruler or flat section, the axis of said horizontal section must coincide with the bipupillary line on the face of the person; this upper horizontal section forming the base of the window, at its midpoint, has a securing point, such as a hole for fixing with the fixing screw to the plate of the support.

This section has, in turn, fused at each of its ends, another section like a ruler positioned perpendicularly, whereby the window is formed. These two sections are located parallel to one another and have graduations or scales, which may be engraved, in low relief or high relief; as appropriate and in accordance with the system of units that it is considered appropriate to use, subdivisions may be made in the rule according to the decimal metric system (SI). In these parallel rules, there is a rail-like mechanism which guides the movement of another part of the device. The graduations in this part of the device allow, by means of mathematical calculations, determining the occlusal plane. There are also graduations in the upper horizontal part, which allow taking dimension of the width of the nose with the rule of the lateral line and these are reproduced in the lower horizontal part.

A third part of the device, constituted by a plane or surface plate in the form of an "H" of unequal arms, whose thickness is enough so that the patients can place it between their jaws and support with the denture; this part of the device serves for the leveling of the occlusal plane and is called the parallelizer of the occlusal plane. This third part is held by the person in order to determine the inclination of the occlusal plane. For this determination, said "H"-shaped surface is moved through two of its associated arms to sliders that slides over both parallel rules of the window (bipupillary alignment rule), which function as rails or guides; since these rules are graduated, there it can take the measurement and, by a formula, determine the angle of inclination of the occlusal plane. The sliders have joints that allow the movement of the parallelizer horizontally, vertically, tilted and rotated, one of said movements or a combination of them, whereby several useful dimensions can be registered to precise the position of the occlusal plane with the highest precision possible.

Then we have a fourth part, which has the shape of a rod about 10 cm with a dilated end in the manner of a drop and the opposite end sharpened; this allows the rod to function as a pendulum. In the body of said rod, near its sharpened end, a small square plate of approximately 0.5 cm of side is incorporated, with a hole in the middle, through which it passes an axis, which allows swing. The sharpened part of the rod swings and the inclination angle of the midline is measured; this can be measured by degrees in the sexagesimal, centesimal or radian degrees, which may be printed or engraved in high or low relief, as appropriate.

The graduations or divisions are arranged in the manner of an arc on a surface of approximately 2 cm×2 cm. This small graduated surface is fixed with the clamping screw or otherwise secured to the first part of the device or support to the face of the patient. This part is called the inclination guide of the dental midline.

The inclination guide of the dental midline can be replaced with an electronic device, such as a chip having the programming to make the determination of the angle of inclination by means of a bubble sensor and allow reading on a small display screen, which can be a led or liquid crystal display.

The fifth part of the device is formed by two rules, arranged one parallel to the other. Each is attached by its ends to the bipupillary alignment rule, in the upper and lower horizontal section; it is on this section that they move, approaching or moving away from each other, to fulfill their function. This fifth part of the device is called the lateral line rule and allows determining the concordance of the width of the nose with the canine teeth.

The sixth part of the device consists of a rule whose arc corresponds to a section of the sphere of Monson and is used for the determination of the arc of Wilson, and to make a design as precise as possible of the incisal edge of the aesthetic sector. This part is called the Wilson curve reference. It can also be replaced by a ruler graduated in millimeters to measure in conjunction with the rod of the determination of the midline and its discrepancy in millimeters.

The seventh part of the device is formed by an accessory, which is the part that secures the device to the articulator; this part is called support of the articulator. The device is associated to the articulator with this part, allowing with good fastening to transfer the dimensions to the articulator and then to make a correction with the spill in wax, on the plaster cast of the jaws.

Optionally, the device may comprise a micro-laser pointer at each of the reading positions to take the dimensions, which points to the point on the patient's face or on the required teeth. This laser device would be in the moving parts and allow the reading in the gradients.

Technological Sector to which the Invention Refers or Applies.

The invention is applied in the health sector, specifically to oral health, dentistry: dimensioning of some part of the face and of this with respect to the oral device, which are useful in the processes of oral rehabilitation and restorative dentistry.

A DESCRIPTION OF A BETTER WAY TO IMPLEMENT OR EXECUTE THE INVENTION

Example

Figure 1:
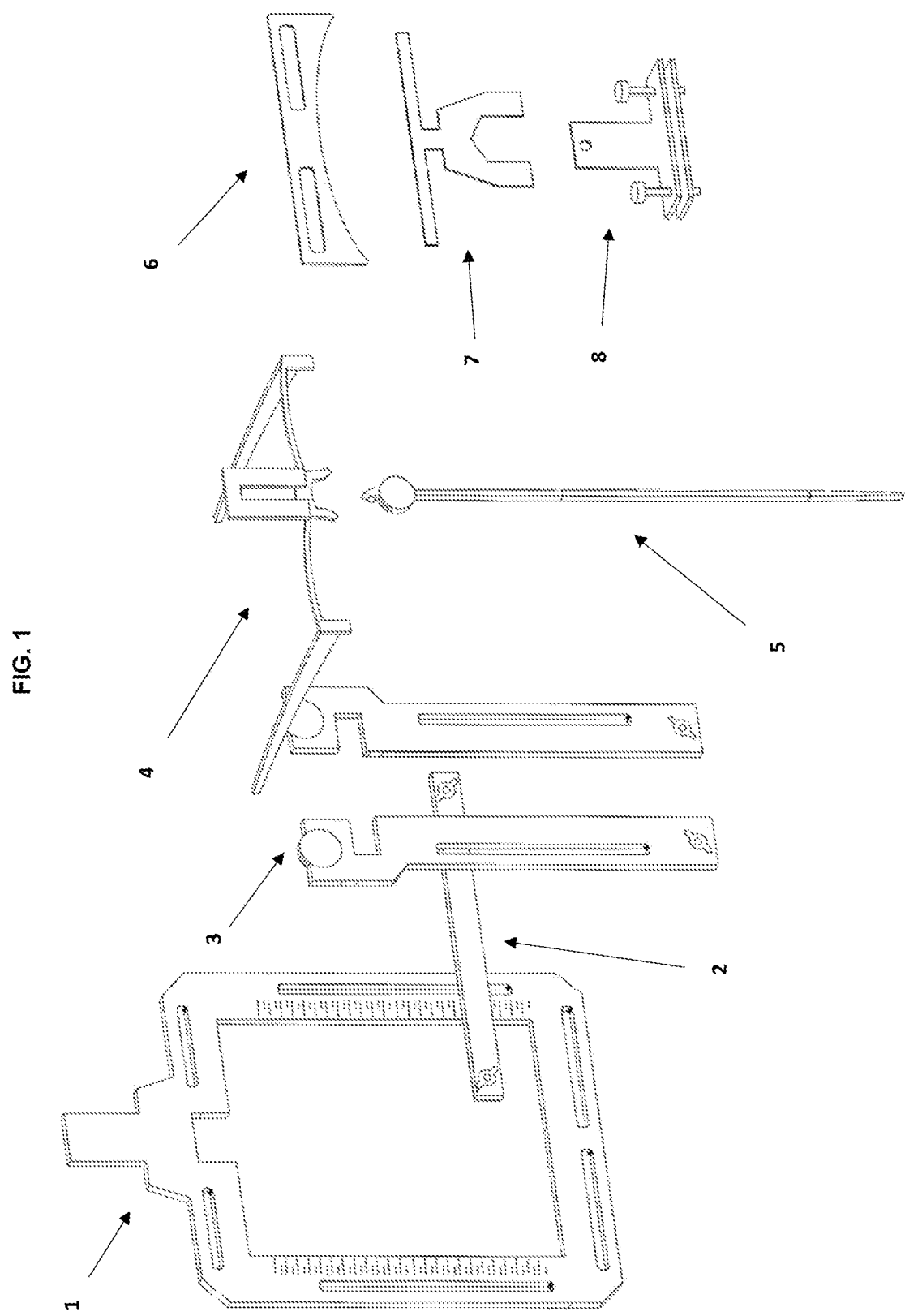
FIG. 01. It shows the parts of the device as it would be disassembled.

The device, in a preferred embodiment, may consist of a frame of standard glasses (4) which fuses a plate with a hole for the fixing screw into which the remaining parts of the device are mounted. The bipupillary alignment rule (1) is made of a transparent acrylic synthetic material, with graduations in millimeters in each of the parallel extensions, and has a guide (2) for the displacement of the occlusal plane parallelizer (7). In this case, the window has been closed and it has become a rectangle whose sides are between 10-25 cm and 8-18 cm; this varies, depending on the age group to which the patient belongs; and a rectangle has been made as to give more stability and precision when taking the dimensions; however, this also depends on the material used in its manufacture. This is only a preferred embodiment, but in no way constitutes a limitation for the implementation of the invention, since other materials may be used, or some variants may be made, provided that this does not affect the arrangement of the essential parts, which allow the recording of the dimensions for which the device has been invented.

The inclination guide of the dental midline (5) is also made of acrylic and allows the readings in a graduation in sexagesimal degrees on a surface approximately 2 cm×2 cm, which is located in the middle section of the ruler of bipupillary alignment (1); the inclination guide of the dental midline in this case is in the form of a rod with an end attached for attachment to the bipupillary alignment rule, but which in turn allows it to swing and thus the angle of inclination can be recorded in the gradient.

The rules of the lateral line (3) and the ruler to take the reference of the Wilson curve (6) is also made of transparent acrylic; the first has millimeters and a guide for the movement of another part of the device.

The occlusal plane parallelizer is also made of acrylic (7).

The support of the articulator (8) is formed by two rectangular, elongated or oblong surfaces, with holes in their ends for a screw in each; this is assembled by arranging them one below and one above a surface of the articulator and adjusting them with the screws at the ends, so that the articulator portion is in the middle of the articulator support as a "sandwich".

Figure 2:
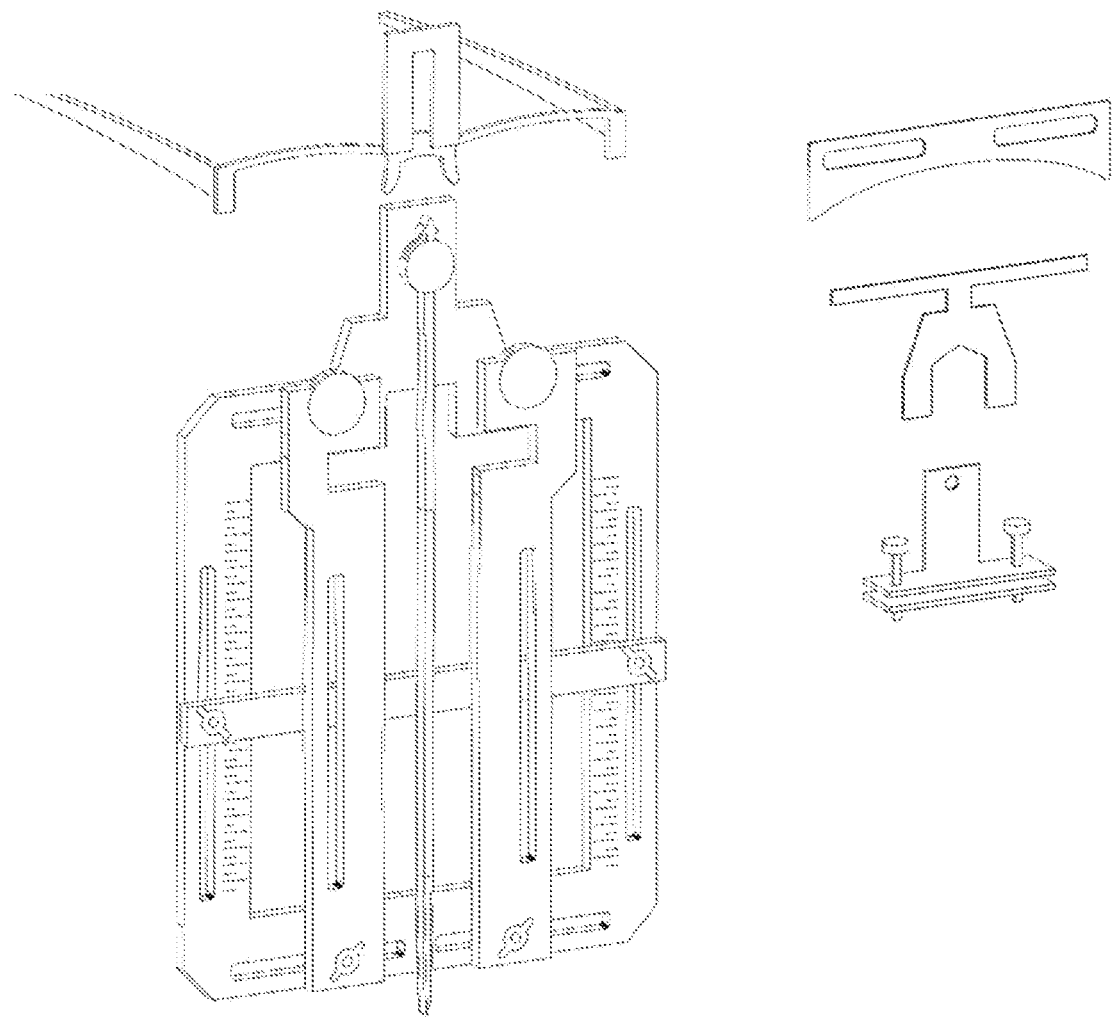
FIG. 02. It shows the complete device, with all its components and how it would be in condition to be arranged in the patient and register the dimensions.

The device with all its parts and ready to be attached to the support can be seen in FIG. 2.

The invention claimed is:

1. A device for dimensioning soft tissues of a face in relation to an oral device and teeth, comprising the following parts: a face support (4) in the form of a frame of optical glasses; a plate with a hole in a bow of the face support (4); a bipupillary alignment rule (1) that has a form of window with an upper horizontal section suitable to match a bipupillary line; a securing point disposed at a midpoint of the upper horizontal section; the securing point is suitable to be fixed with the plate of the face support (4); two parallel rules that are parallel to each other, both parallel rules fused with the upper horizontal section, to get the form of window; wherein the two parallel rules have graduations; two lateral alignment rules (3); wherein ends of the lateral alignment rules are fixed to the upper horizontal section and a lower horizontal section of the bipupillary alignment rule (1); wherein the two lateral alignment rules are suitable for moving, approaching or moving away from each other; a reference rule of a Wilson curve (6) that includes an arc; a parallelizer of an occlusal plane (7) with an "H" shape of unequal arms; wherein the parallelizer of the occlusal plane (7) is suitable for moving in an horizontal, vertical, inclined, rotated way or a combination of these forms of movement; and an articulator support (8) that includes two rectangular and elongated surfaces with holes at their ends suitable for housing screws at each end.

2. The device according to claim 1, characterized in that the bipupillary alignment rule (1) includes an inclination guide of a midline (5) with form of a rod with an end swingingly attached to the middle section of the bipupillary alignment rule (1), allowing the inclination guide of the midline (5) to swing.

3. The device according to claim 1, characterized in that the bipupillary alignment rule (1), the lateral alignment rules (3), the parallelizer of the occlusal plane (7), the ruler for reference of the Wilson curve (6), the inclination guide of a midline (5) and the articulator support (8) are made of a translucent, non-deformable material.

4. The device according to claim 3, characterized in that the translucent, non-deformable material comprises an acrylic material.

5. The device according to claim 1, wherein the bipupillary alignment rule (1), the lateral alignment rules (3), the parallelizer of the occlusal plane (7), the ruler for reference of the Wilson curve (6), the inclination guide of a midline (5) and the articulator support (8) comprise graduations for dimensioning.

* * * * *